US010252451B2

(12) United States Patent
Quere et al.

(10) Patent No.: US 10,252,451 B2
(45) Date of Patent: Apr. 9, 2019

(54) DEVICE FOR MOULDING A PLASTIC COMPONENT HAVING AT LEAST ONE UNDERCUT

(71) Applicant: MECAPLAST FRANCE, Clamart (FR)

(72) Inventors: Joseph Quere, Menton (FR); Sébastien Huck, Roquebrune Cap Martin (FR); Aurore Claverie, Roquebrune Cap Martin (FR)

(73) Assignee: MECAPLAST FRANCE, Clamart (FR)

( * ) Notice: Subject to any disclaimer, the term of this patent is extended or adjusted under 35 U.S.C. 154(b) by 2 days.

(21) Appl. No.: 15/321,503

(22) PCT Filed: Jun. 26, 2015

(86) PCT No.: PCT/FR2015/051742
§ 371 (c)(1),
(2) Date: Dec. 22, 2016

(87) PCT Pub. No.: WO2015/197995
PCT Pub. Date: Dec. 30, 2015

(65) Prior Publication Data
US 2017/0144340 A1 May 25, 2017

(30) Foreign Application Priority Data
Jun. 27, 2014 (FR) .................................... 14 56100

(51) Int. Cl.
B29C 43/32 (2006.01)
B29C 43/42 (2006.01)
(Continued)

(52) U.S. Cl.
CPC .......... *B29C 44/582* (2013.01); *B29C 44/388* (2013.01); *B29C 44/586* (2013.01); *B29K 2995/0064* (2013.01)

(58) Field of Classification Search
CPC ....... B29C 33/20; B29C 33/207; B29C 33/40; B29C 33/44–33/485; B29C 44/388; B29C 44/582; B29C 44/586
(Continued)

(56) References Cited

U.S. PATENT DOCUMENTS 4,403,810 A * 9/1983 Bieneck ............... B29O 33/202
425/589
5,603,968 A * 2/1997 Tajiri ................... B29O 33/442
264/318

(Continued)

FOREIGN PATENT DOCUMENTS

WO 2009021346 A2 2/2009

OTHER PUBLICATIONS

International Search Report for Application No. PCT/FR2015/051742.

*Primary Examiner* — Joseph S Del Sole
*Assistant Examiner* — Thu Khanh T Nguyen
(74) *Attorney, Agent, or Firm* — Cantor Colburn LLP

(57) ABSTRACT

A device for molding a plastic component having at least one undercut is disclosed herein. The device including; a fixed block and a mobile block, the fixed block and the mobile block joining along a joining plane and defining first and second cavities defining a molding cavity to receive the plastic, the molding cavity having a first volume and a main direction of demolding; means of separating the mobile block from the fixed block; at least one mobile insert placed in the fixed block; thrusting means urging the mobile insert toward the mobile block; means for moving the at least one
(Continued)

mobile element in a secondary direction not parallel to the main direction of demolding.

16 Claims, 3 Drawing Sheets

(51) Int. Cl.
    *B29C 44/58*     (2006.01)
    *B29C 44/38*     (2006.01)

(58) Field of Classification Search
    USPC .................................. 425/4 R, 450.1–451.9
    See application file for complete search history.

(56)                   References Cited

U.S. PATENT DOCUMENTS

| | | | |
|---|---|---|---|
| 6,849,218 B1 * | 2/2005 | De Winter | B29O 37/0032 264/240 |
| 7,192,543 B2 * | 3/2007 | Malfliet | B29O 33/44 264/313 |
| 7,967,598 B2 * | 6/2011 | Miyabe | B29O 44/086 249/82 |
| 2007/0023945 A1 | 2/2007 | Valentinsson | |
| 2011/0221087 A1 * | 9/2011 | Miyabe | B29C 44/086 264/40.5 |

* cited by examiner

DEVICE FOR MOULDING A PLASTIC COMPONENT HAVING AT LEAST ONE UNDERCUT

CROSS REFERENCE TO RELATED APPLICATIONS

The application is a National Phase Application of Patent Application PCT/FR2015/051742 filed on Jun. 26, 2015, which claims the benefit of and priority to French Patent Application 14/56100 filed on Jun. 27, 2014, the contents each of which are incorporated herein by reference in their entirety.

TECHNICAL FIELD

The present invention concerns a device for molding and foaming a plastic part from a plastic material including a solubilized gas. The invention also concerns a molded plastic part obtained by this device.

BACKGROUND

In the field of manufacturing parts made of a plastic material, it is known to use a plastic material which contains a solubilized gas in order to limit the amount of injected plastic material and the weight of the obtained part. Thus, during molding, the material is intended to undergo a foaming phase.

This method is known for implementing light parts.

However, the gain in weight may be considerably increased.

There are several systems for managing the final thickness of the part; however, these systems integrate complex mold opening kinematics.

In addition, an inherent limitation to the method of plastic injection with foaming is the management of undercut portions of the parts.

Indeed, due to the partial opening of the mold allowing foaming of the plastic material, the commonly-used molds do not allow making undercut areas.

BRIEF SUMMARY

In this technical context, one aim of the invention is to propose a device for molding a foamed plastic part presenting one or several undercut portion(s).

Another aim of the invention is to provide a device for molding a foamed plastic part allowing a greater gain in weight.

To this end, the present invention proposes a device for molding a plastic part from a plastic material including a solubilized gas, characterized in that the device comprises:
a fixed block comprising a first half-cavity and a movable block comprising a second half-cavity, the fixed block and the movable block being joined at a parting plane and the first and second cavities delimiting a molding recess designed to receive the plastic material, having a first volume and presenting a main demolding direction,
means for separating the movable block relative to the fixed block, allowing to make the molding recess pass from the first volume to a second volume;
at least one movable insert disposed in the fixed block carrying at least one movable element, thrust means urging the movable insert in the direction of the movable block, the thrust means being configured so that the movable insert accompanies the separation of the movable block between the first volume and the second volume, while keeping constant the separation between the second half-cavity formed in the movable block and the movable element(s) carried by the movable insert,
means for displacing the movable element(s) in a secondary direction non-parallel to the main demolding direction during a full opening.

Thus, it is therefore possible to proceed to foaming of the injected plastic material while allowing obtaining undercut regions in the plastic part, without damage or detachment during the foaming of the plastic part.

Thus, the invention allows making, by foaming, molded parts presenting complex geometries—undercuts and/or bores—which require the implementation of one or several movable element(s) in the mold. One of the contributions of the invention is the presence in the mold of a movable insert and of movable block separation means which accompany the opening of the parting plane during the foaming phase.

The movable insert is designed to carry elements used to manage undercuts which comprises, for example, drawers or wedges. The movable element allows directing the elements forming undercuts in the main demolding direction during a short stroke corresponding to the passage of the recess from a first volume to a second volume. During the opening of the mold for enabling the ejection of the part, these same elements allowing to make the undercuts return to a secondary displacement direction different from the main demolding direction. This direction is mentioned as being a secondary direction.

It is understood that in the present document, the terms «main demolding axis» or «main direction» refer to an axis or a direction which extends along the direction parallel to the direction of separation of the movable block relative to the fixed block and the terms «secondary demolding axis» or «secondary direction» refer to an axis or a direction intersecting the movable block separation direction.

Moreover, the expression «undercut» defines part geometries which prevent the natural ejection of a molded plastic part along the main demolding axis.

According to a possible embodiment of the invention, it is considered that at least one movable insert is in addition disposed in the movable block.

Advantageously, the device comprises, in addition, means for controlling the opening position of the movable block relative to the fixed block comprising a movable base plate which can take an opening position of the device, configured to cause the separation of the movable block and to retract a retaining member controlling the opening of the mold in its second volume.

According to a possible embodiment of the invention, the retaining member pivotally mounted on the fixed block includes a protruding portion intended to be engaged into a notch formed in the movable block, the notch and the protruding portion being configured to enable the separation of the movable block relative to the fixed block by a predefined distance so that the molding recess passes from the first volume to the second volume.

According to a particular arrangement, the thrust elements comprise first cylinders, such as hydraulic springs or mechanical springs. The use of mechanical separation means associated to these first cylinders allows reaching the desired molding and foaming accuracy.

According to a possible embodiment of the invention, the separation means further comprise cylinders, such as hydraulic springs or mechanical springs, interposed between the movable block and the fixed block.

According to one possibility, the fixed block comprises at least one rising wedge driven by the movable insert along the main demolding direction during the phase of passage from the first volume to the second volume and then returns to its secondary direction during the full opening of the molding device.

According to a possible embodiment, the fixed block comprises at least one drawer driven by the movable insert along the main demolding direction during the phase of passage from the first volume to the second volume and then returns to its secondary direction during the full opening of the molding device.

According to a second aspect of the invention, the latter concerns a molded plastic part comprising regions of plastic material with and without undercut presenting a variable foaming density.

Thus, a plastic part lightened by its foamed regions, requiring a low amount of plastic material and including undercut regions, is obtained.

Thus, the present invention proposes a molding device allowing manufacturing foamed plastic parts with complex shapes such as undercut regions.

Furthermore, the plastic part comprises, at least, one first region of plastic material presenting a first foaming density and at least one second undercut region of plastic material presenting a second foaming density lower than the first foaming density, each of these regions presenting substantially a similar thickness.

BRIEF DESCRIPTION OF THE DRAWINGS

Other aspects, aims and advantages of the present invention will better appear upon reading the following description of one embodiment thereof, given as a non-limiting example and made with reference to the appended drawings. For their clarity, the figures do not necessarily comply with the scale of all the represented elements. For simplification, in the following description, identical, similar or equivalent elements of the different embodiments carry the same reference numerals.

DETAILED DESCRIPTION

Figure 1:
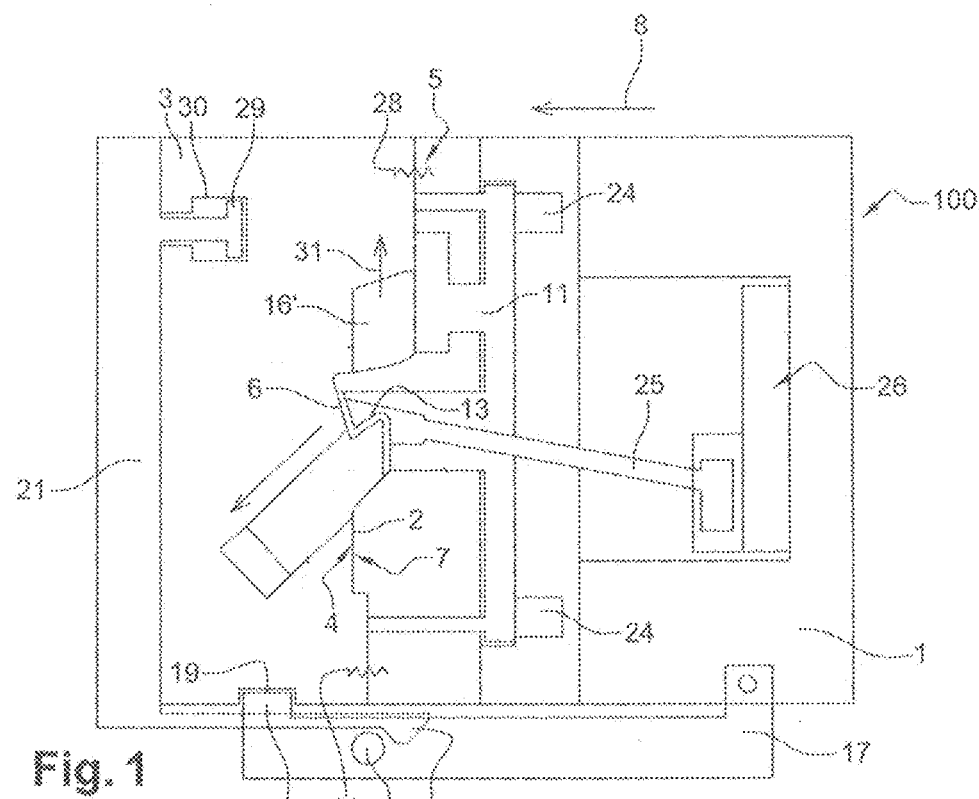
FIG. 1 illustrates a sectional view of the molding device according to one embodiment of the present invention.

As illustrated in FIG. 1, the molding device 100 comprises a fixed block 1 including a first half-cavity 2 and a movable block 3 including a second half-cavity 4, the fixed block 1 and the movable block 3 being joined at a parting plane 5. The first and the second half-cavities 2, 4 delimit a molding recess 6, intended to receive an injected plastic material including a solubilized gas in a first volume 7. The molding recess 6 presents a main demolding axis 8, extending substantially along the opening direction of the molding device, and substantially perpendicular to the parting plane 5.

The device 100 further comprises at least one movable insert 11 disposed in the fixed block 1. This movable insert 11 is intended to be displaced relative to the movable block 3 by thrust means, while accompanying the separation of the movable block 3 and while keeping constant the separation between the second half-cavity 4 and the movable element (s) carried by the movable insert. For this purpose, the thrust means may comprise cylinders 24 or springs interposed between the fixed block 1 and the movable insert 11.

Figure 2:
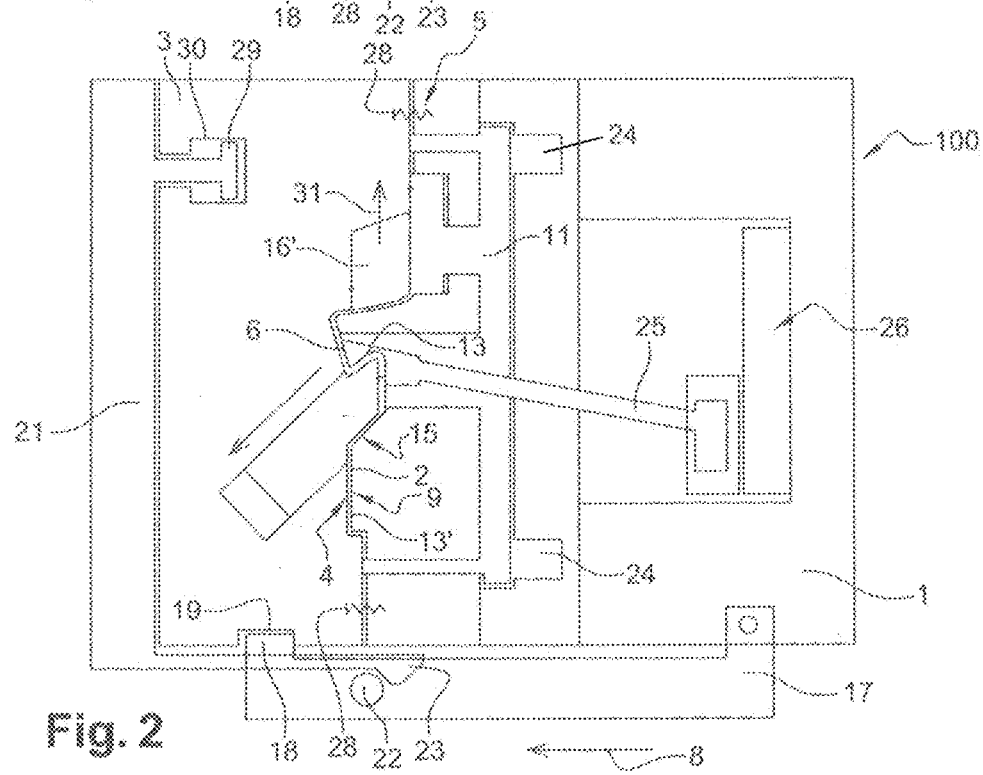
FIG. 2 illustrates a sectional view of the device represented in FIG. 1 in the position of foaming the injected plastic material.

Moreover, the molding device 100 also comprises means for separating the movable block relative to the fixed block (1) which will be described below. This allows the passage of the molding recess 6 from the first volume 7 to a larger second volume 9, intended to allow foaming of the injected plastic material (FIG. 2). The molding recess 6 according to the second volume 9 corresponds to the envelope of the molded part 15. According to one arrangement, the separation means comprise cylinders 28, interposed between the two blocks 1 and 3, so as to assist the action of the thrust means.

In the previously described example, the presence of a rising wedge 25 guided by the movable insert 11 is noticed.

A drawer 16' is guided by the movable insert 11; this drawer is designed to form an undercut, which comprises an opening passing through the final part 15 in the example illustrated in the figures. The drawer 16' is then configured to be driven during the partial opening of the molding device by the movable insert 11 along the direction of the main axis 8. During the full opening of the molding device, the drawer returns to its natural demolding direction along an axis 31 non-parallel to the main demolding axis 8.

When the molding recess 6 passes from the first volume 7 to the second volume 9 by the separation of the two blocks 1 and 3, the space of the molding recess 6 is enlarged, the movable insert 11 follows the partial opening of the molding device thanks to the thrust elements. Secondary movable elements (e.g., rising wedge 25 and drawer 16') are driven by the movable insert 11 are displaced along the main demolding axis (FIG. 2).

This arrangement of the invention allows foaming the injected plastic material in the regions where the molding recess 6 is enlarged and prevents or limits foaming in the regions whose thickness remains substantially constant.

As illustrated in FIGS. 1 and 2, the means for controlling the opening position of the mold comprise a retaining member 17 pivotally mounted on the fixed block 1 and including a protruding portion 18 engaged into a notch 19 provided in the movable block 3. The dimensions of the notch 19 and of the protruding portion 18 are determined so as to enable the displacement of the protruding portion 18 in the direction of the main demolding axis 8. This arrangement allows the separation of the movable block 3 from the fixed block 1 by a predefined distance under the action of the thrust means. This predefined distance corresponds to the passage of the molding recess 6 from the first volume 7 to the second volume 9 for foaming.

Figure 4:
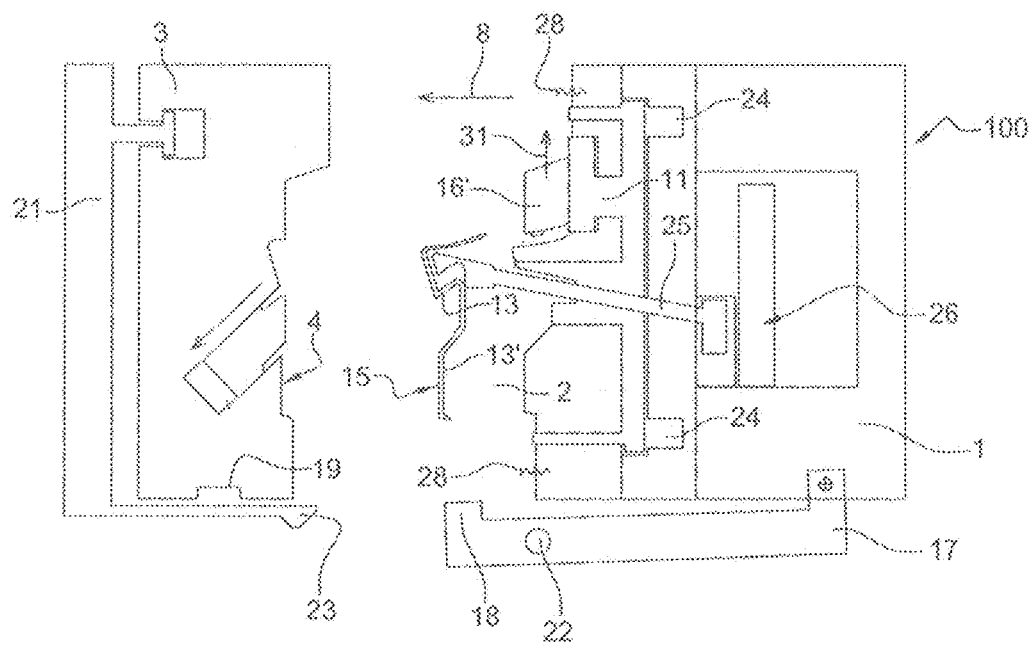
FIG. 4 illustrates a sectional view of the device represented in FIG. 1 in which the plastic part is extracted from the molding device.

The means for controlling the opening position further comprise a movable base plate 21 which can be displaced between a first position in which the movable block 3 is joined to the fixed block 1 for the injection of the plastic material (FIG. 1), an intermediate partial opening position enabling the separation of the movable block 3 by the predefined distance (FIG. 2) and a full opening position in which the molding device 100 is fully open for the ejection of the plastic part 15 (FIG. 4). The movable base plate 21 is equipped with a T-shaped stud 29 in the represented example, which is inserted in an aperture 30 and which acts as an abutment during the full opening of the molding device.

Figure 3:
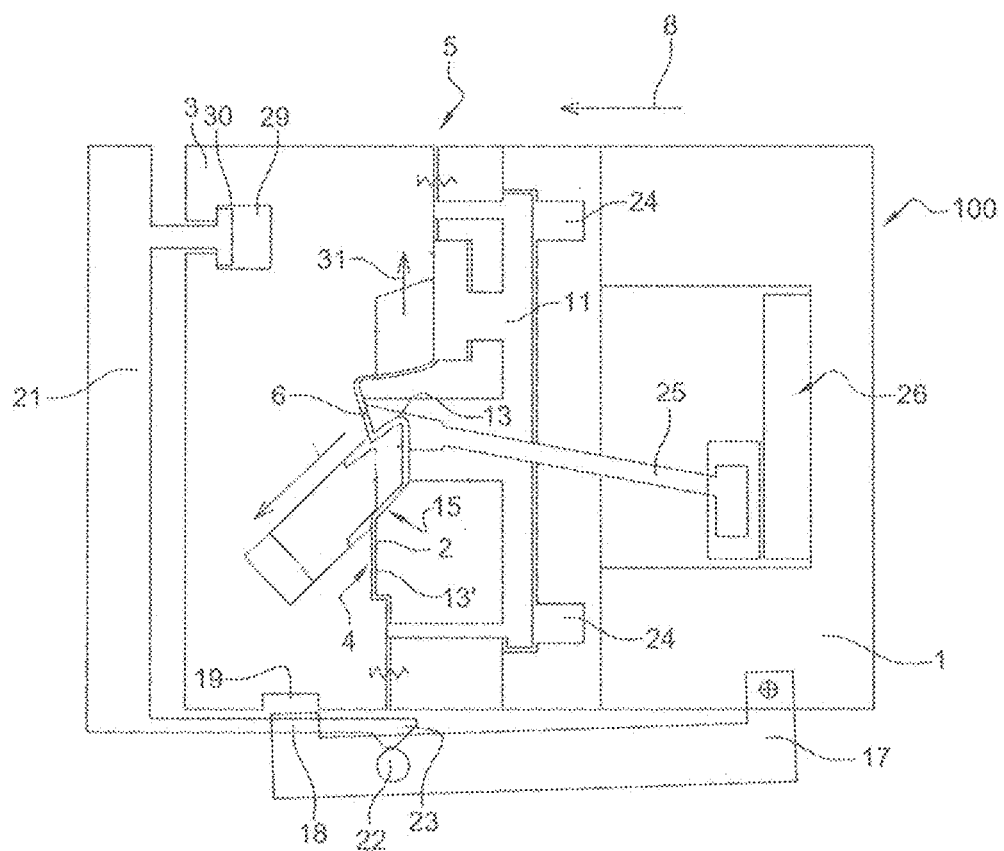
FIG. 3 illustrates a sectional view of the device represented in FIG. 1 during opening after foaming.

As illustrated in FIGS. 2 and 3, during the passage from the intermediate position to the full opening position where the stud 29 abuts on the movable block 3, the retaining member 17 is disengaged from the notch 19. Thus, the movable block 3 can be separated from the fixed block 1 beyond the predefined distance for the ejection of the plastic part 15.

According to the embodiment illustrated in FIGS. 1 to 4, the retaining member 17 comprises a pin 22 and the movable base plate 21 comprises an abutment 23, the abutment 23 and the pin 22 being configured to cooperate together so that the displacement of the movable base plate 21 from the intermediate position to the opening position causes the displacement of the pin 22 resulting in the retraction of the retaining member 17.

As illustrated in FIG. 4, once the molding and then the foaming have been carried out, the molding device 100 is opened by a distance beyond the predefined distance so as to be able to eject the plastic part. The drawer 16' slides along the surface of the fixed block 1 thereby releasing the opening formed in the part 15 along a secondary direction. The rising wedge 25 is then driven by means of an ejection battery 26 so as to eject the plastic part 15.

Figure 5:
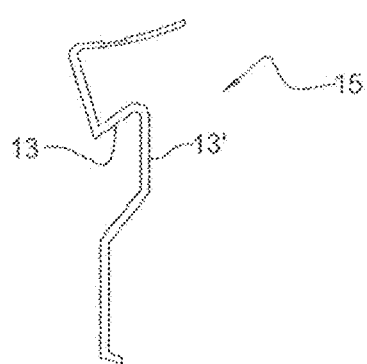
FIG. 5 illustrates the foamed plastic part according to one embodiment of the present invention.

FIG. 5 illustrates a molded plastic part 15 which may be obtained from an injection press comprising the molding device 100 as described before. Such a plastic part 15 comprises regions 13' constituted by a foamed plastic material presenting a first foaming density and regions 13 presenting a second foaming density different from the first density. As illustrated, the regions of foamed plastic material 13' and those of non-foamed plastic material 13 present a similar thickness, for example of 2.5 mm.

It goes without saying that the invention is not limited to the embodiments described hereinabove as examples but it comprises all technical equivalents and variants of the described means as well as their combinations.

The invention claimed is:

1. A device for molding a plastic part from a plastic material including a solubilized gas, characterized in that the device comprises:
   a mold having a fixed block comprising a first half-cavity and a movable block comprising a second half-cavity, the fixed block and the movable block being joined at a parting plane and the first and second cavities delimiting a molding recess designed to receive the plastic material, having a first volume and presenting a main demolding direction,
   means for separating the movable block relative to the fixed block, allowing making the molding recess pass from the first volume to a second volume;
   at least one movable insert disposed in the fixed block carrying at least one movable element, thrust means urging the movable insert in the direction of the movable block, the thrust means being configured so that the movable insert moves during the separation of the movable block between the first volume and the second volume, and the movable insert keeps constant the separation between the second half-cavity formed in the movable block and the movable element(s) carried by the movable insert,
   means for displacing the movable element(s) in a secondary direction non-parallel to the main demolding direction during a full opening.

2. The device according to claim 1, characterized in that at least one movable insert is disposed in the movable block.

3. The device according to claim 1, characterized in that the device comprises, in addition, means for controlling an opening position of the movable block relative to the fixed block comprising a movable base plate which can take an opening position of the device, configured to cause the separation of the movable block and to retract a retaining member controlling an opening of the mold in its second volume.

4. The device according to claim 3, characterized in that the retaining member pivotally mounted on the fixed block includes a protruding portion intended to be engaged into a notch formed in the movable block, the notch and the protruding portion being configured to enable the separation of the movable block relative to the fixed block by a predefined distance so that the molding recess passes from the first volume to the second volume.

5. The device according to claim 1, wherein the thrust means comprises first cylinders, such as hydraulic springs or mechanical springs.

6. The device according to claim 1, wherein the means for separating comprises cylinders, such as hydraulic springs or mechanical springs, interposed between the movable block and the fixed block.

7. The device according to claim 1, wherein the fixed block comprises, at least, one rising wedge driven by the movable insert along the main demolding direction during passage from the first volume to the second volume and then returns to its secondary direction during the full opening of the molding device.

8. The device according to claim 1, wherein the fixed block comprises at least one drawer driven by the movable insert along the main demolding direction during passage from the first volume to the second volume and then returns to its secondary direction during the full opening of the molding device.

9. The device according to claim 2, characterized in that the device comprises, in addition, means for controlling an opening position of the movable block relative to the fixed block comprising a movable base plate which can take an opening position of the device, configured to cause the separation of the movable block and to retract a retaining member controlling an opening of the mold in its second volume.

10. The device according to claim 9, characterized in that the retaining member pivotally mounted on the fixed block includes a protruding portion intended to be engaged into a notch formed in the movable block, the notch and the protruding portion being configured to enable the separation of the movable block relative to the fixed block by a predefined distance so that the molding recess passes from the first volume to the second volume.

11. The device according to claim 10, wherein the thrust elements comprise first cylinders, such as hydraulic springs or mechanical springs.

12. The device according to claim 11, wherein the separation means further comprise cylinders, such as hydraulic springs or mechanical springs, interposed between the movable block and the fixed block.

13. The device according to claim 12, wherein the fixed block comprises, at least, one rising wedge driven by the movable insert along the main demolding direction during passage from the first volume to the second volume and then returns to its secondary direction during the full opening of the molding device.

14. The device according to claim 13, wherein the fixed block comprises at least one drawer driven by the movable insert along the main demolding direction during passage from the first volume to the second volume and then returns to its secondary direction during the full opening of the molding device.

15. The device according to claim 2, wherein the fixed block comprises, at least, one rising wedge driven by the movable insert along the main demolding direction during passage from the first volume to the second volume and then returns to its secondary direction during the full opening of the molding device.

16. The device according to claim 2, wherein the fixed block comprises at least one drawer driven by the movable insert along the main demolding direction during passage from the first volume to the second volume and then returns to its secondary direction during the full opening of the molding device.

* * * * *